Aug. 21, 1923.
L. A. MAPEL
1,465,768
INDICATING DEVICE
Filed Nov. 19, 1921
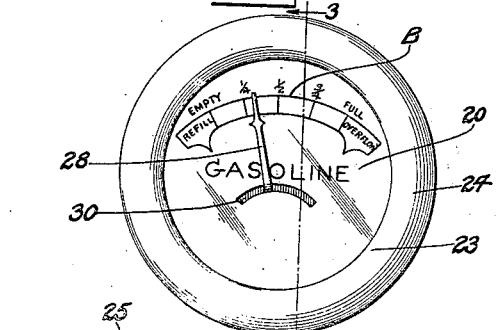
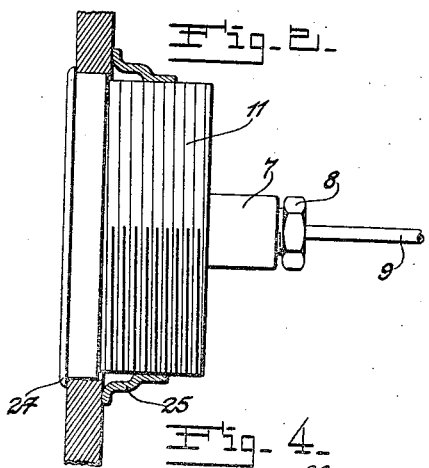
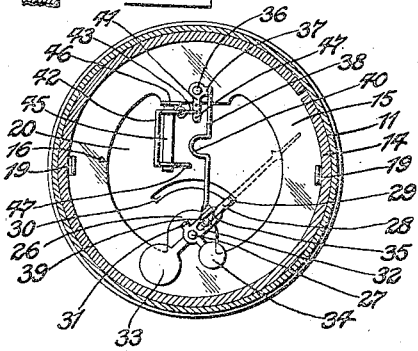
Inventor.
Lewis A. Mapel,
by Puppy Kingsland
His Attorneys.

Patented Aug. 21, 1923.

1,465,768

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

INDICATING DEVICE.

Application filed November 19, 1921. Serial No. 516,337.

*To all whom it may concern:*

Be it known that I, LEWIS A. MAPEL, a citizen of the United States, residing at the city of St. Louis and State of Missouri, have invented a new and useful Indicating Device, of which the following is a specification.

This invention relates to indicating devices, and an object thereof is to afford the operator of an automobile or other vehicle reliable and accurate information as to the quantity of fuel in his tank.

Another object of the invention is to indicate the operative condition of the usual fuel elevating system of an automobile engine.

Other objects of the invention are to provide an efficient device for the purposes mentioned characterized by simplicity of design, few and simple character of parts forming the device, ease and facility of adjustment to various conditions, and the fact that one standard scale is used for tanks of various sizes with which this device is intended to cooperate.

Other objects and advantages obtained by the invention will appear from the following description, reference being made to the drawing, in which—

Fig. 1 is an elevation of the complete indicating device.

Fig. 2 is a side elevation showing the indicating device mounted in connection with a support as, for instance, the instrument board of an automobile.

Fig. 3 is a vertical longitudinal sectional view on the line 3—3 of Fig. 1, showing the operative mechanism of the device.

Fig. 4 is a cross sectional view on the line 4—4 of Fig. 3.

Fig. 5 is a front elevation of the movement supporting base.

Fig. 6 is an elevation showing a modified form of scale used in the device when the device is used solely for the purpose of indicating the amount of contents of the tank as distinguished from the operative condition of the elevating system.

Fig. 7 is an enlarged sectional view showing details of the diaphragm and base members which constitute the controlling unit of the instrument.

In the embodiment of the invention shown in the drawing the controlling element 1 is in the form of a circular diaphragm having its edge 2 spun into a circumferential groove 3 in the base member 4. A quantity of solder 5 additionally secures the spun edge 2 of the diaphragm within the groove of the base member and insures an air-tight joint. The relative position of the diaphragm 1 and base 4 allows relatively small backward motion of the diaphragm 1, thus preventing straining of the diaphragm due to excessive backward movement. The base member has a central opening 6 therethrough communicating with an opening or passage through a fitting 7 attached to the base member. The outer end of the fitting 7 is formed with a threaded hole which receives the threaded extension of a coupling 8 having a central hole therethrough alined with the hole through the fitting 7 and receiving the end of a tube 9 for admitting pressure through the base member 4 against the outer side of the diaphragm 1. A dampener device 10 composed of filter paper or the like is held in position to form a seal between the coupling 8 and the fitting 7, as well as to dampen the movement of the diaphragm 1. Thus the dampener device 10 performs the double function stated.

The base member 4, having the other parts connected therewith as described, is mounted in a housing 11 having an internal circumferential shoulder 12 engaging an offset around the outer portion of the base member. The base member and the parts in connection therewith, as above described, are held in proper relationship to the housing by an interlock which, in the form shown, comprises a pin or lug 13 on the base member engaging within a suitable notch in the shoulder 12. A spacer element in the form of a split ring 14 fitting within the housing 11 presses against the outer edge of the diaphragm 1. The spacer element is held in position within the housing by the movement supporting base 15. The movement supporting base is in the form of a disc having a relatively large central opening 16 and a rim 17 fitting against the inner surface of the wall of the housing 11. The movement supporting base 15 has a pair of slots or holes 18 receiving projections 19 (Fig. 4) on a dial 20 seated against the movement supporting base within the rim 17. An elastic cushion 21 within the rim 17 of the movement supporting base is pressed against the edge of the dial 20 by a glass face 22. The glass face 22 is of a size to fit within the rim 17 of the movement supporting base and is retained therein and pressed to position by a ring 23 arranged for threaded engagement with the housing 11 and having a shoulder 24 for engaging the instrument board or other support in connection with which the indicating device is mounted. When the ring 23 is screwed home it bears against the outer edge of the rim 17 of the movement supporting base 15, which in turn is pressed against the spacer ring 14, which presses against the outer edge of the diaphragm 1 secured to the base member 4, which is in locked engagement with the circumferential shoulder 12 of the housing 11. Thus it will be seen that the tightening of the ring 23 causes firm engagement of all of the members just mentioned, making a firmly assembled unit. It will be noted that the pressure exerted upon the glass 22 by the ring 23 is only sufficient to compress the cushion 21 against the dial 20, holding the same in place.

A flared ring 25 is screwed on the opposite end of the housing 11 for engagement with the opposite side of the instrument board or support to secure and hold the indicating device in position.

The movement supporting base 15 has an extension 26 within the opening 16. A spindle 27 is attached to the extension 26 and pivotally supports the indicator lever unit. In the form shown the indicator lever unit comprises an indicator 28 having an offset portion 29 extending outwardly through an arcuate slot 30 in the dial 20 and having its free end near the face of the dial. The unit also comprises a bracket portion 31 for connecting the indicator portion of the unit with the lever portion 32 of the unit. The indicator 28 of the unit is formed with a counterweight 33 and an actuating weight 34. The weight 34 is provided to distribute the weight radially from the axis 27 in more than one direction to ease the operation of the indicator by the lever mechanism. The lever portion 32 of the unit is formed with a slot or notch 35 (Fig. 4) extending outwardly relative to the axis of the spindle 27 on which the lever indicator unit is pivoted.

At the opposite side of the opening 16 the movement supporting base supports a spindle 36 (Figs. 3 and 4) on which a bracket 37 is pivoted. An arm 38 extends from the bracket 37 for engagement with the lever indicator unit. As shown, the engagement is obtained by a pin 39 on the end of the arm 38 extending into the groove or slot 35 of the lever 32. Obviously, the rocking of the bracket 37 will actuate the lever indicator unit. The ratio of movement imparted to the lever indicator unit by the arm 38 may be varied by shortening or lengthening the arm 38 by means of an adjustment offset 40.

The bracket 37 has an arm 41 connected with one arm of a bell crank lever 42 by means of a connecting link 43. The point of connection of the link 43 with the arm 41 may be varied, said arm 41 being provided with a number of holes 44 for that purpose. The bell crank lever 42 is mounted on a spindle 45 secured to an arm 46 formed from a bent portion of the movement supporting base 15. The bell crank lever 42 has a finger 47 extending to position for receiving movement from the lug 48 on the adjacent side of the diaphragm 1.

The front face of the movement supporting base 15 has a scale A stamped thereon for the proper setting of the device. The scale A corresponds with the scale B on the dial with which the indicator 28 cooperates when the device is in use. The scale B is employed when the device operates as described in my application Serial No. 476,333, filed June 9, 1921.

In Fig. 6 a modified form of a dial is shown for use when the indicating device is used in conjunction with the instrument described in my application Serial No. 476,334, filed June 9, 1921. The dial of Fig. 6 is intended for use in place of the dial 20 when such substitution is desired. The scale C on the dial shown in Fig. 6, likewise, corresponds to the scale A on the movement supporting base. The dial shown in Fig. 6 has ears 49 for engagement in the holes 18 formed in the movement supporting base to hold the dial in proper position. As shown, ample space is provided on the dials 20 by this construction for trademarks, etc.

From the foregoing description it is apparent that the invention obtains all of its intended objects in a highly efficient manner. The different units embodied within the device may be constructed separately so that when brought together into a cooperative relationship at a point of assembly they will cooperate perfectly for their intended purposes. One of the units mentioned comprises the base 4 with the diaphragm 1 in connection with it; another of the units comprises the movement supporting base 15 and the lever mechanism supported thereby for operation by the diaphragm; and the unit for holding the first two units in proper spaced relationship comprises the ring 14. The several units mentioned are held in proper position by the parts shown and described for that purpose. Proper adjustment of the lever indicator unit to cause the indicator 28 to operate properly is effected before the dial 20 is applied. Access to the parts of the lever indicator unit for such adjustment may be obtained through the opening 16 in the movement supporting base. The indicator 28 must have the same relationship to the scale A on the movement supporting base that it will have to the scale B on the dial 20 after the dial is applied. Hence the scale A is an accurate guide for the proper adjustment of the parts of the lever indicator unit, and the opening 16 in the movement supporting base affords convenient access for such adjustment.

After proper adjustment has been obtained the dial 20 (Fig. 1) or the dial shown in Fig. 6 depending upon the use to which the device is to be applied, is placed in position with the projections on the dial engaging in the holes 18 in the movement supporting base. This will hold the dial with the scale B or C thereon in proper position for cooperation with the indicator 28, the adjustment of which had been obtained as described.

After the dial has been positioned the cushion 21 is placed within the rim 17 of the movement supporting base and pressed against the edge of the dial. Next the glass face 22 is placed against the cushion 21, it being understood that said face is made of a size to pass into the rim 17 as shown. Next, the ring 23 is screwed on the housing and, by pressure against the glass face 22, compresses the cushion 21, causing the cushion to press against the edge of the dial. The ring 23 contacts with the outer edge of the rim 17 of the movement supporting base, which exerts pressure against the spacer ring 14 which, in turn, presses against the edge of the diaphragm. This cooperative relationship holds the diaphragm and the base member thereof in interlocked connection with the shoulder 12 of the housing 11. In this way the various units of the device may be easily assembled after the individual units have been completed and brought to the point of assembly.

When the movement supporting base is placed within the housing, as shown in Fig. 3, the finger 47 must contact with the lug 48 when the indicator 28 registers at "Empty" on the dial. If this does not occur when the movement is placed within the housing the parts may be brought to such relationship by bending in proper direction the arm 46. To vary the sweep of the indicator 28 extensively the point of connection of the link 43 with the arm 41 is changed to one or another of the holes 44 in said arm 41. Except in extreme cases this adjustment will not be needed, because the assembler obtains the same or better results by proper selection of the diaphragm placed in the assembly. The angle of engagement of the arm 38 with the lever 32 may be varied simply by bending the arm 38 in either direction to obtain the desired movement of the indicator 28.

Moreover, the length of the arm 38 may be varied to control the movement of the indicator 28 relative to the movement of the diaphragm 1. The length of the arm 38 may be increased or reduced for this purpose by expanding or contracting the offset 40. This adjustment is provided because of the well known characteristics of the diaphragm slowing up in its movement, the farther the movement takes place, so in this case, as the lever 32 and the arm 38 rotate a change in ratio between these arms is effected by this adjustment of the offset 40 to properly cause the indicator 28 to assume a uniform speed of travel.

In any case it will be observed by reference to Fig. 4 that as the mechanism is operated by movement of the diaphragm and the indicator 28 is moved in a counter-clockwise direction, as viewed in Fig. 4, the point of connection between the arm 38 and the lever 32 approaches the axis of said lever 32 in proper ratio to the slowing of the movement of the diaphragm 1. This variation in the point of engagement of the arm 38 with the lever 32 is continuous from the first movement of the diaphragm to the final movement thereof and is properly proportioned so that the indicator at all times affords accurate information as to the content of the tank and, in the case of the dial shown in Fig. 1, as to the operative condition of the fuel elevating system. If the fuel elevating system is operating inefficiently the indicator 28 will be noticeably oscillated thereby affording indication of that fact.

In this connection it is useful to mention that an important feature in the adjustments is the assembly in one unit of the several parts that are ordinarily in detached units.

What I claim and desire to secure by Letters Patent is:—

1. In an indicating device, a controlling element for causing motion to be imparted to an indicator, a lever mechanism for multiplying the movement of the controlling element, means supporting the lever mechanism independently of the controlling element, and a connection operatively uniting certain parts of the lever mechanism for causing the movement of the indicator to speed up in relative proportion to the slowing up of the movement of the controlling element.

2. In an indicating device, the combination of an indicator, a lever rigid with the indicator, a controlling element, a lever mechanism for imparting movement to said first named lever and thereby to the indicator from the controlling element, and construction in the lever mechanism whereby the movement of the indicator is speeded up in relative proportion to the slowing up of the controlling element.

3. In an indicating device, the combination of an indicator, a controlling element responsive to pressure, lever mechanism for imparting movement to the indicator from the controlling element, means supporting the lever mechanism independently of the controlling element, and construction embodied in the lever mechanism for increasing the movement of the indicator in the ratio of the decrease of the movement of the controlling element.

4. In an indicating device, the combination of an indicator, a scale arranged in cooperative relation to the indicator having a number of spaces of uniform size thereon, a controlling element, a lever mechanism for imparting movement to the indicator from the controlling element, means supporting the lever mechanism independently of the controlling element, and means for multiplying the extent of movement of the indicator in proportion to the slowing up of the movement of the controlling element.

5. In an indicating device of the character described, the combination with a dial, an elastic member for engaging said dial, a glass face engaging said elastic member, of means whereby all of said members are held in operative engagement and whereby the pressure on the glass face is limited to the compression of the elastic member.

6. An indicating device, comprising a series of separate disconnected cooperative units arranged in cooperative relationship, a housing in which said units are supported, and an expansible and compressible split ring within the housing between said units holding said units in the cooperative relationship.

7. An indicating device, comprising a series of separate disconnected cooperative units arranged in cooperative relationship, a housing in which said units are supported, an expansible and compressible split ring within the housing between said units holding said units in the cooperative relationship, and an element having removable connection with the housing holding said units and said ring in proper position within the housing.

8. In an indicating device, a housing, a base member removably supported within the housing provided with a circumferential groove, a diaphragm within the housing and having its edge crimped within the groove, said diaphragm being responsive to pressure admitted through the base member, a tube opening through the base member to admit pressure against the diaphragm, means located within the groove forming a seal with the crimped edge of the diaphragm to prevent the escape of pressure, and indicating mechanism within the housing actuated by the diaphragm.

9. In an indicating device, a housing, a base member removably supported within the housing provided with a circumferential groove, a diaphragm within the housing and having its edge crimped within the groove, said diaphragm being responsive to pressure admitted through the base member, a tube opening through the base member to admit pressure against the diaphragm, means located within the groove forming a seal with the crimped edge of the diaphragm to prevent the escape of pressure, indicating mechanism within the housing actuated by the diaphragm, and means engaging the housing and cooperating with the indicating mechanism to hold the base member and the diaphragm in proper position.

10. An indicating instrument, comprising a housing, a diaphragm device forming a unit removably supported within the housing, a removable split resilient ring within the housing holding the diaphragm device in position, lever mechanism within the housing, a support for the lever mechanism within the housing pressing said ring to position, an indicator device operated by the lever mechanism, and an element removably engaging the housing and said support to hold all of said parts in proper cooperative relationship leaving the indicator free for operation by the lever mechanism.

11. In an indicating device, the combination with an actuating diaphragm and lever mechanism arranged to be operted by the diaphragm; of an indicator device arranged to be operated by the lever mechanism and comprising as an entity a pivoted indicator arm, a balance weight in connection with the indicator arm, and an actuating weight for actuating the indicator arm in the direction opposite from the direction as moved by the diaphragm; and a device connecting the indicator arm with the lever mechanism, said device being pivoted upon self-contained bearings.

12. An indicating device, comprising a housing, a base member at one end of the housing having an opening therethrough for the admission of pressure, a diaphragm within the housing attached to the base member and responsive to pressure admitted through said opening, a spacing ring within the housing having one end bearing against said diaphragm, a supporting element within the housing bearing against the opposite end of said ring, a plate located at the outer side of said supporting element having a scale thereon, an indicator pivotally supported by said supporting element cooperating with said scale, lever mechanism carried by said supporting element for operation by said diaphragm, means connecting said lever mechanism with said indicator, and devices for pressing said supporting element against said ring and thereby pressing the ring against said diaphragm to hold said parts in proper fixed relationship.

13. An indicating device, comprising a housing, a diaphragm supported within the housing, a tube opening into the housing for admitting pressure against one side of the diaphragm, a supporting element within the housing, means for holding the supporting element in proper position in the housing, a lever operable by said diaphragm, an indicator, and an arm operated by said lever and having one end connected with said indicator and having a flexible offset portion whereby the length of the arms may be varied.

14. An indicating device, comprising a housing, a diaphragm supported within the housing, a tube opening into the housing for admitting pressure against one side of the diaphragm, a supporting element within the housing, means for holding the supporting element in proper position in the housing, a lever operable by said diaphragm, an indicator, an arm operated by said lever and having one end connected with said indicator and having a flexible offset portion whereby the length of the arm may be varied, and a porous gasket in the opening from said tube into the housing forming dampening means to prevent violent movement of the indicating mechanism by the diaphragm.

LEWIS A. MAPEL.